US009479946B2

(12) United States Patent
Simonyi et al.

(10) Patent No.: US 9,479,946 B2
(45) Date of Patent: Oct. 25, 2016

(54) SYSTEM AND METHOD FOR CONTROLLING MOBILE DEVICE OPERATION (71) Applicant: Google Inc., Mountain View, CA (US)

(72) Inventors: Gyula Simonyi, Dublin (IE); Zoltan Stekkelpak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/148,724

(22) Filed: Jan. 6, 2014

(65) Prior Publication Data
US 2014/0194106 A1   Jul. 10, 2014

Related U.S. Application Data (63) Continuation of application No. 13/557,053, filed on Jul. 24, 2012, now Pat. No. 8,626,192.

(51) Int. Cl.
*H04W 24/00* (2009.01)
*H04W 24/02* (2009.01)
*H04W 4/02* (2009.01)
(Continued)

(52) U.S. Cl.
CPC ............ *H04W 24/02* (2013.01); *H04W 4/023* (2013.01); *H04M 1/72572* (2013.01); *H04W 48/02* (2013.01)

(58) Field of Classification Search
USPC ............... 455/418–422.1, 456.1–456.4, 565, 455/566–569.1
See application file for complete search history.

(56) References Cited

U.S. PATENT DOCUMENTS

2005/0222752 A1* 10/2005 Sokola ................ H04W 4/04
701/532
2007/0057068 A1* 3/2007 Tsai ...................... G06F 1/1626
235/472.01
2008/0108329 A1* 5/2008 Cho ........................ H04L 12/66
455/413

(Continued)

FOREIGN PATENT DOCUMENTS

WO   2011022326 A1   2/2011

OTHER PUBLICATIONS

Chinese Patent Application No. 201380039647.9 Notification of First Office Action mailed Jul. 28, 2015.

(Continued)

*Primary Examiner* — Dai A Phuong
(74) *Attorney, Agent, or Firm* — Troutman Sanders LLP; James E. Schutz; Christopher C. Close, Jr.

(57) ABSTRACT

Implementations herein include receiving a first signal from a first mobile computing device, the first signal indicative of a first state change and receiving a second signal from a second mobile computing device, the second signal indicative of a second state change. The method may also include determining that the first state change and the second state change are related, and that the first mobile computing device and the second mobile computing device are currently located at a common geographic location. The method may further include determining that a third mobile computing device is currently located at the common geographic location. The method may also include transmitting to the third mobile computing device, a third signal indicative of a recommended state change, the recommended state change being based on the first state change at the first mobile computing device and the second state change at the second mobile computing device.

20 Claims, 4 Drawing Sheets (51) Int. Cl.
*H04W 48/02* (2009.01)
*H04M 1/725* (2006.01)

(56) References Cited

U.S. PATENT DOCUMENTS

| | | |
|---|---|---|
| 2008/0153554 A1 | 6/2008 | Yoon et al. |
| 2009/0203370 A1 | 8/2009 | Giles et al. |
| 2010/0311465 A1* | 12/2010 | Lai ................ H04M 1/6058 455/556.2 |
| 2011/0047558 A1 | 2/2011 | Agulnik et al. |
| 2013/0084922 A1* | 4/2013 | Liu ................ G06F 1/1626 455/566 |
| 2013/0326253 A1* | 12/2013 | Lam ................ G06F 1/3206 713/323 |
| 2014/0221020 A1* | 8/2014 | Xie ................ G01C 22/00 455/456.3 |
| 2015/0066823 A1* | 3/2015 | Rubin ............. H04M 1/72563 706/12 |
| 2015/0319282 A1* | 11/2015 | Park ............... G06F 1/1626 455/566 |

OTHER PUBLICATIONS

German Patent Application No. 112013003676.2 Office Action dated Nov. 19, 2015.

* cited by examiner

SYSTEM AND METHOD FOR CONTROLLING MOBILE DEVICE OPERATION

CROSS-REFERENCE TO RELATED APPLICATIONS

This Application is a continuation application claiming priority under 35 U.S.C. §120 to U.S. patent application Ser. No. 13/557,053, filed 24 Jul. 2012, the entire contents and substance of which is incorporated by reference as if fully set out below.

BACKGROUND

Mobile devices are of often required to be set in specific states in specific situations. Motivations for these requirements may be socially driven (e.g., muting a phone in an opera house), or technology driven (e.g., putting a phone into a communications-disabled state, such as "airplane mode" before a flight). While these requirements are generally clearly communicated, they are rarely technically enforced, leaving the responsibility to comply with the requirement to the device operator who unintentionally or otherwise, fails to put their device in the required state.

SUMMARY OF DISCLOSURE

In one implementation, a method, in accordance with this disclosure, may include receiving, at a server computing device, a first signal from a first mobile computing device, the first signal indicative of a first state change at the first mobile computing device. The method may further include receiving, at the server computing device, a second signal from a second mobile computing device, the second signal indicative of a second state change at the second mobile computing device. The method may also include determining, at the server computing device, that the first state change at the first mobile computing device and the second state change at the second mobile computing device are related, and that the first mobile computing device and the second mobile computing device are currently located at a common geographic location. The method may further include determining, at the server computing device, that a third mobile computing device is currently located at the common geographic location. The method may also include transmitting, by the server computing device, to the third mobile computing device, a third signal indicative of a recommended state change to the third mobile computing device, the recommended state change being based at least in part on the first state change at the first mobile computing device and the second state change at the second mobile computing device.

One or more of the following features may be included. In some implementations, determining that the first state change and the second state change are related may be based at least in part on a confidence threshold calculation, the confidence threshold calculation being based at least in part on a first location of the first mobile computing device and a second location of the second mobile computing device. In some implementations, the confidence threshold may be based upon, at least in part, a percentage of devices currently located at the common geographic location that have undergone a particular state change. In some implementations, determining the common geographic location may be based upon, at least in part, a threshold distance between a reported GPS location of the first mobile computing device and a reported GPS location of the second mobile computing device. In some implementations, the first state change may include at least one of a communications-disabled state (e.g., an "airplane mode") setting change, a ringer setting state change, a vibration setting state change, and an audio setting state change. The method may also include determining a time of the first state change and a time of the second state change. In some implementations, the recommended state change may be based upon, at least in part, at least one of the time of the first state change and the time of the second state change. The method may also include receiving one or more device level signals at the server computing device. In some implementations, the device level signals may include at least one of noise level and accelerometer data used to determine the first state change.

In another implementation, a non-transitory processor readable storage medium having a plurality of instructions stored thereon is provided. In some implementations, the instructions, which when executed by a processor, cause the processor to perform one or more operations. Some operations may include receiving, at a server computing device, a first signal from a first mobile computing device, the first signal indicative of a first state change at the first mobile computing device. Operations may also include receiving, at the server computing device, a second signal from a second mobile computing device, the second signal indicative of a second state change at the second mobile computing device. Operations may further include determining, at the server computing device, that the first state change at the first mobile computing device and the second state change at the second mobile computing device are related, and that the first mobile computing device and the second mobile computing device are currently located at a common geographic location. Operations may also include determining, at the server computing device, that a third mobile computing device is currently located at the common geographic location. Operations may additionally include transmitting, by the server computing device, to the third mobile computing device, a third signal indicative of a recommended state change to the third mobile computing device, the recommended state change being based at least in part on the first state change at the first mobile computing device and the second state change at the second mobile computing device, wherein the recommended state change is based upon, at least in part, an amount of time between the first state change and the second state change.

One or more of the following features may be included. In some implementations, determining that the first state change and the second state change are related may be based at least in part on a confidence threshold calculation, the confidence threshold calculation being based at least in part on a first location of the first mobile computing device and a second location of the second mobile computing device. In some implementations the confidence threshold may be based upon, at least in part, a percentage of devices currently located at the common geographic location that have undergone a particular state change. In some implementations, determining the common geographic location may be based upon, at least in part, a threshold distance between a reported GPS location of the first mobile computing device and a reported GPS location of the second mobile computing device. In some implementations, the first state change may include at least one of an airplane setting state change, a ringer setting state change, a vibration setting state change, and an audio setting state change. In some implementations, operations may further include determining a time of the first state change and a time of the second state change. In some implementations, the recommended state change may be based upon, at least in part, at least one of the time of the first state change and the time of the second state change. Operations may further include receiving one or more device level signals at the server computing device. In some implementations, the device level signals may include at least one of noise level and accelerometer data used to determine the first state change.

In another implementation, a computing system is provided. In some implementations, the computing system may include one or more processors associated with a client electronic device, which may include, but is not limited to, smart phones, tablet computers, laptops, and other communications-enabled electronic devices. The one or more processors associated with the computing device may be configured to receive, at a server computing device, a first signal from a first mobile computing device, the first signal indicative of a first state change at the first mobile computing device. The one or more processors may be further configured to receive, at the server computing device, a second signal from a second mobile computing device, the second signal indicative of a second state change at the second mobile computing device. The one or more processors may be further configured to determine, at the server computing device, that the first state change at the first mobile computing device and the second state change at the second mobile computing device are related, and that the first mobile computing device and the second mobile computing device are currently located at a common geographic location. The one or more processors may be further configured to determine, at the server computing device, that a third mobile computing device is currently located at the common geographic location. The one or more processors may be further configured to determine, at the server computing device, a type of the third signal, the type being one or more of a push notification and an alert. The one or more processors may be further configured to transmit, by the server computing device, to the third mobile computing device, a third signal indicative of a recommended state change to the third mobile computing device, the recommended state change being based at least in part on the first state change at the first mobile computing device and the second state change at the second mobile computing device.

One or more of the following features may be included. The one or more processors may be further configured to determine that the first state change and the second state change are related based at least in part on a confidence threshold calculation, the confidence threshold calculation being based at least in part on a first location of the first mobile computing device and a second location of the second mobile computing device. In some implementations, the confidence threshold may be based upon, at least in part, a percentage of devices currently located at the common geographic location that have undergone a particular state change. In some implementations, determining the common geographic location may be based upon, at least in part, a threshold distance between a reported GPS location of the first mobile computing device and a reported GPS location of the second mobile computing device. In some implementations, the first state change may include at least one of an airplane setting state change, a ringer setting state change, a vibration setting state change, and an audio setting state change. The one or more processors may be further configured to determine a time of the first state change and a time of the second state change. In some implementations, the recommended state change may be based upon, at least in part, at least one of the time of the first state change and the time of the second state change. In some implementations, the one or more processors may be further configured to receive one or more device level signals at the server computing device. In some implementation, the device level signals may include at least one of noise level and accelerometer data used to determine the first state change.

In one implementation, a method, in accordance with this disclosure, may include transmitting, by a first mobile computing device, a first signal to a server computing device, the first signal indicative of a first state change at the first mobile computing device. The method may further include receiving, by the first mobile computing device, second signal from the server computing device indicative of a recommended state change, the recommended state change being based at least in part on a second state change at a second mobile computing device and a third state change at a third mobile computing device, wherein the server computing device determined the second state change and third state change are related and currently located at a common geographic location and that the first mobile computing device is currently located at the common geographic location.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Implementations disclosed herein are directed towards a method, which may be used to reduce the chance of a mobile device being left outside of its required state, thereby correcting occasional human error. In some implementations, the mobile device control process described herein may monitor and/or effectuate the state change of one or more devices in a particular range, thus building on the assumption that the majority of the group in the situation will comply with the requirements and correctly set the device state. Implementations disclosed herein may include the process of identifying situations where a certain device state is required and of a staged approach to proactively set that state on the mobile device.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
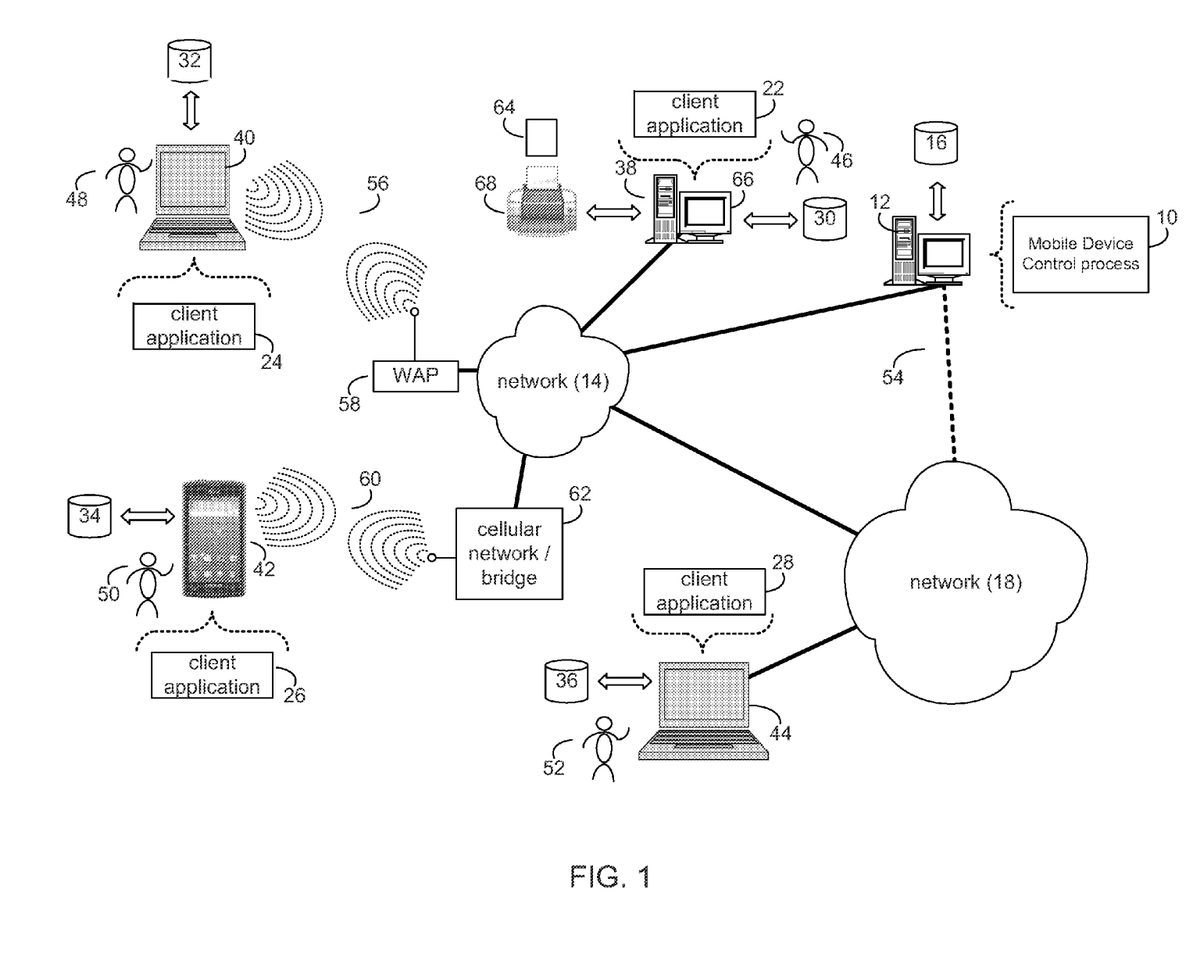
FIG. 1 is a diagrammatic view of a method for controlling a mobile device in accordance with an implementation of the present disclosure.

Referring to FIG. 1, there is shown mobile device control process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a mainframe computer, or a computing cloud. The various components of computer 12 may execute one or more operating systems.

The instruction sets and subroutines of mobile device control process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Mobile device control process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 may be configured to effectuate some or all of the functionality of mobile device control process 10. Accordingly, mobile device control process 10 may be a purely server-side application, a purely client-side application, or a hybrid server-side/client-side application that is cooperatively executed by one or more of client applications 22, 24, 26, 28.

Users 46, 48, 50, 52 may access computer 12 and mobile device control process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Figure 2:
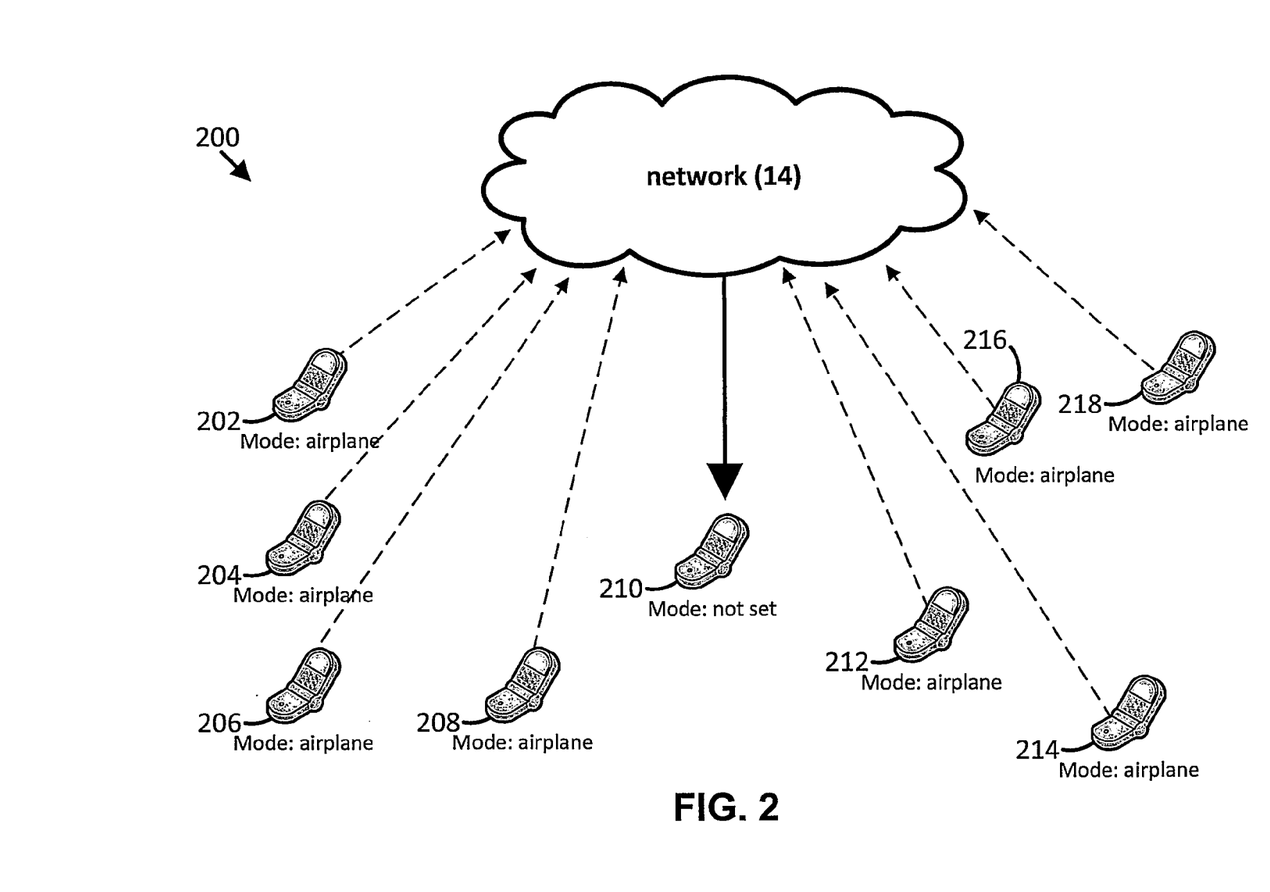
FIG. 2 is a diagrammatic view of a method for controlling a mobile device in accordance with an implementation of the present disclosure.

Referring now to FIG. 2, a diagram 200 depicting one implementation in accordance with a mobile device control process 10 is provided. Diagram 200 includes a plurality of mobile devices (e.g., mobile devices 202, 204, 206, 208, 210, 212, 214, 216, and 218) connected to one or more networks (e.g., network 14). In this particular example, each of the mobile devices shown may be located within an airplane, accordingly, mobile devices 202, 204, 206, 208, 212, 214, 216, and 218 have all been set to a communications-disabled state (e.g., an "airplane mode") by their respective users, as is shown in FIG. 2. Mobile device 210 has not been set to a communications-disabled state (e.g., an "airplane mode").

It should be noted that the communications-disabled state (e.g., an "airplane mode") example described herein is provided merely by way of example, as the teachings of the present disclosure may be used in any number of suitable situations. For example, some other applications may include, but are not limited to, a ringer setting state change, a vibration setting state change, an audio setting state change, etc. For example, the mobile device control process described herein may find particular use controlling and/or recommending changes to mobile devices located in opera houses, movie theatres, or other similar locales in which silence is encouraged (e.g., placing the mobile devices in mute or vibrate to minimize distractions).

As discussed above and referring also to FIG. 3, mobile device control process 10 may be configured to receive (302), at a server computing device (e.g., server computing device 12) a first signal from a first mobile computing device (e.g., mobile computing device 202). In some implementations, the first signal may be indicative of a first state change at the first mobile computing device (e.g., the user of mobile computing device 202 setting the device into a communications-disabled state (e.g., an "airplane mode")). In this way, the first signal may be transmitted through one or more networks (e.g., network 14) to server computing device 12.

Figure 3:
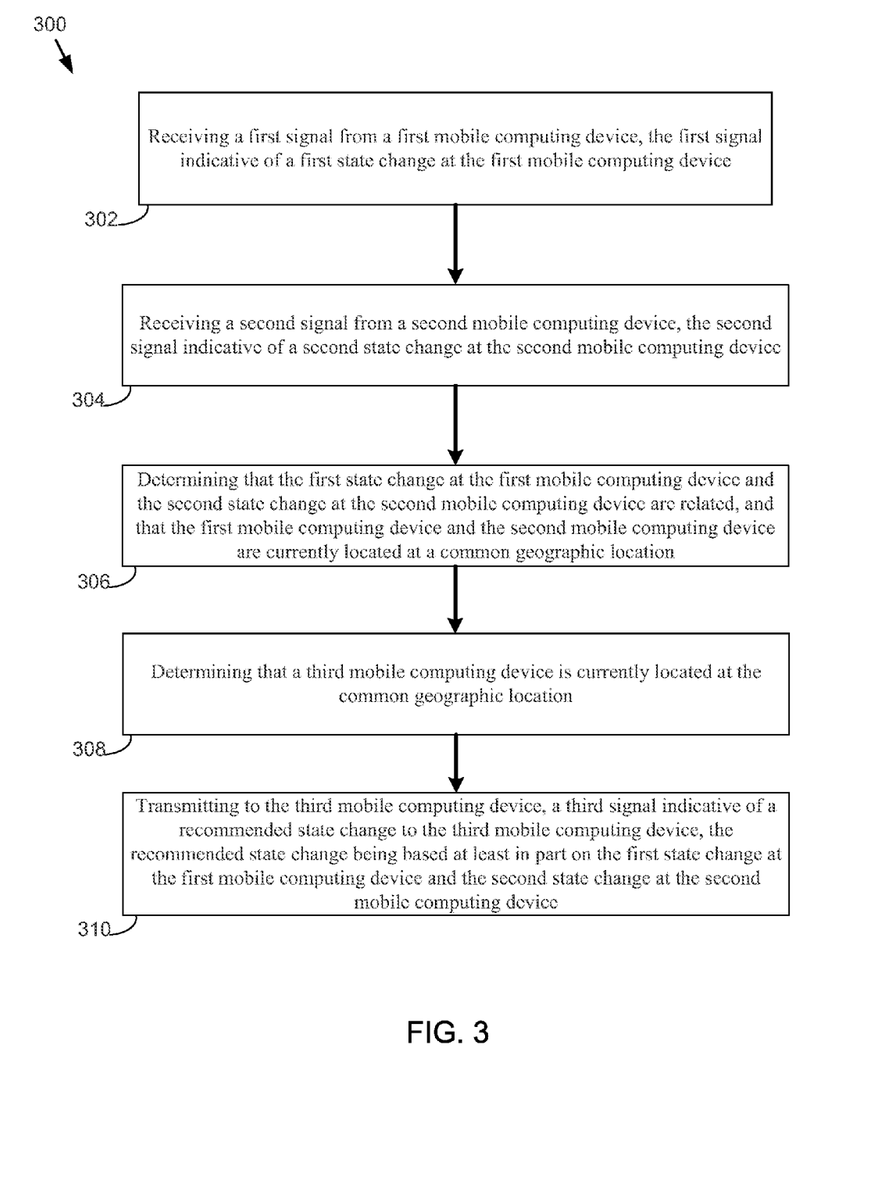
FIG. 3 is a diagrammatic view of a method for controlling a mobile device in accordance with an implementation of the present disclosure.

In some implementations, the user of mobile computing device 202 may set the device into a communications-disabled state (e.g., an "airplane mode"). Mobile device control process 10 may delay the device being set into the communications-disabled state (e.g., an "airplane mode") until the mobile computing device 202 is able to transmit the first signal from the first mobile computing device (e.g., mobile computing device 202) to the server computing device (e.g., server computing device 12).

In some implementations, mobile device control process 10 may be further configured to receive (304), at the server computing device (e.g., server computing device 12), a second signal from a second mobile computing device (e.g., mobile computing device 204). In some implementations, the second signal may be indicative of a second state change at the second mobile computing device (e.g., the user of mobile computing device 204 setting the device into a communications-disabled state (e.g., an "airplane mode")). Accordingly, the second signal may also be transmitted through one or more networks (e.g., network 14) to server computing device 12.

In some implementations, mobile device control process 10 may be further configured to determine (306), at the server computing device (e.g., server computing device 12), that the first state change at the first mobile computing device and the second state change at the second mobile computing device are related. For example, mobile device control process 10 may be configured to identify that the state change at mobile device 202 and the state change at mobile device 204 are both related to changes to each mobile device's communications-disabled state (e.g., an "airplane mode"). In some implementations, determining that the first state change and the second state change are related may be based upon a confidence threshold calculation. The confidence threshold calculation may be based upon the respective locations of the first and second computing devices. Additionally and/or alternatively, the confidence threshold calculation may be based upon a number and/or a percentage of mobile devices currently located at the common geographic location that have undergone a particular state change. For example, the confidence threshold calculation may be extremely high in the example where mobile devices 202, 204, 206, 208, 212, 214, 216, and 218 have all been set to a communications-disabled state (e.g., an "airplane mode") and only mobile device 210 is the outlier. However, the confidence threshold calculation may be lower if only mobile device 202 and 204 have been set to a communications-disabled state (e.g., an "airplane mode"). In this way, mobile device control process 10 may be configured to utilize this calculation prior to providing a recommended state change. For example, a signal including the recommended state change may only be set if the percentage is greater than 80%.

Additionally and/or alternatively, mobile device control process 10 may be further configured to determine that the first mobile computing device and the second mobile computing device are currently located at a common geographic location (e.g., within and/or nearby an airplane, airport, etc.). In some implementations, determining the common geographic location may be based upon, at least in part, a threshold distance between a reported GPS location of the first mobile computing device and a reported GPS location of the second mobile computing device. For example, mobile device control process 10 may be configured to determine that one or more of mobile devices 202, 204, 206, 208, 210, 212, 214, 216, and 218 are all located within 100 feet of each other. In this way, only devices within this determined location may receive the recommended state change. For example, other phones in the vicinity (e.g., in the airplane terminal) may not receive the same recommended state change because they are not located within the same geographic location (e.g., more than 100 feet from any of mobile devices 202, 204, 206, 208, 210, 212, 214, 216, and 218).

In some implementations, mobile device control process 10 may be further configured to determine (308), at the server computing device (e.g., server computing device 12), that a third mobile computing device (e.g., mobile computing device 210) is currently located at the common geographic location (e.g., within and/or nearby an airplane, airport, etc.).

In some implementations, mobile device control process 10 may be further configured to transmit (310), by the server computing device (e.g., server computing device 12), to the third mobile computing device, a third signal indicative of a recommended state change to the third mobile computing device. For example, server computing device 12 may transmit the third signal to third mobile computing device 210 recommending that mobile computing device 210 be set to a communications-disabled state (e.g., an "airplane mode"). Accordingly, this recommended state change may be based at least in part on the first state change at the first mobile computing device 202 and the second state change at the second mobile computing device 204.

In some implementations, mobile device control process 10 may be further configured to determine a time of the first state change and a time of the second state change. The time associated with each mobile device's state change may be factored into determining the recommended state change. For example, if mobile devices 202, 204, 206, 208, 212, 214, 216, and 218 are all set to a communications-disabled state (e.g., an "airplane mode") within 15 minutes of each other, mobile device control process 10 may determine that the recommended state change be transmitted to mobile device 210. Alternatively, if the timing of each mobile device's state change is exceeds a particular time frame or the amount of time between each device's state change is too high, mobile device control process 10 may refrain from transmitting the recommended state change signal. In some implementations, the time associated with each mobile device's state change may be included within the confidence threshold calculation discussed above.

In some implementations, mobile device control process 10 may be further configured to receive one or more device level signals at the server computing device. Some device level signals may include, but are not limited to, noise level and accelerometer data associated with one or more of the mobile devices (e.g., mobile devices 202, 204, 206, 208, 210, 212, 214, 216, and 218). In some implementations, mobile device control process 10 may use device level signals to determine a first state change of the first mobile computing device.

In some implementations, mobile device control process 10 may be configured to determine a type of signal to transmit to a respective mobile device. Some signal types may include, but are not limited to, push notifications, alerts, etc. In this way, mobile device control process may automatically set a mobile device in a particular state or may send a recommendation to the mobile device. Determining the type of signal to transmit may be based upon any number of factors including the confidence threshold calculation. For example, if the confidence threshold calculation is above a particular level then the state may be changed automatically. Additionally and/or alternatively, in the event that the confidence threshold calculation is lower, mobile device control process 10 may transmit a recommendation or alert.

In some implementations, mobile device control process 10 may be configured to receive a signal indicative of a recommended state change initiated at a venue or by administrator at a particular geographic location (e.g., opera house, movie theater). In some implementations, the signal indicative of a recommended state change may be transmitted by a non-mobile computing device. In some implementations, mobile device control process 10 may effectuate a state change responsive to a received signal indicative of a recommended state change.

Figure 4:
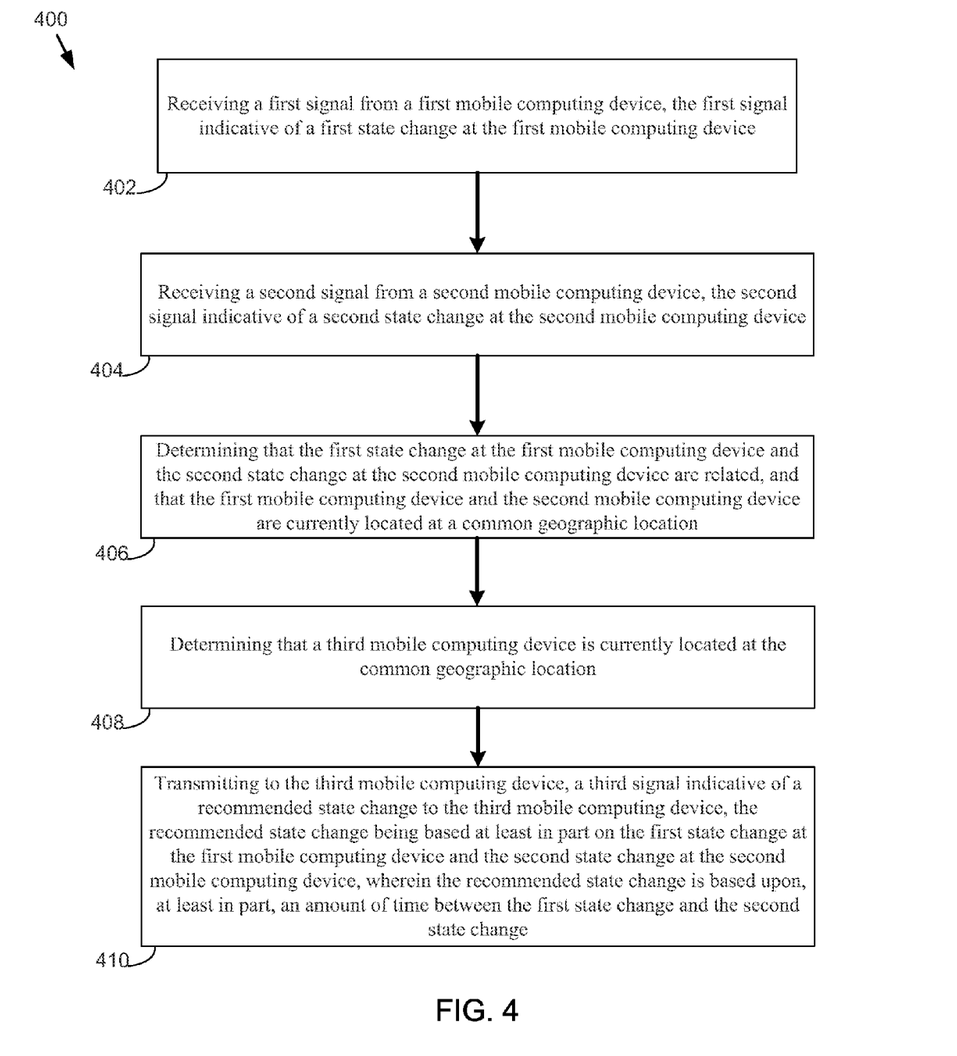
FIG. 4 is a flowchart of a method for controlling a mobile device in accordance with an implementation of the present disclosure.

Referring now to FIG. 4, mobile device control process 10 may be configured to receive (402) a first signal from a first mobile computing device, the first signal indicative of a first state change at the first mobile computing device. Mobile device control process 10 may be further configured to receive (404) a second signal from a second mobile computing device, the second signal indicative of a second state change at the second mobile computing device. Mobile device control process 10 may be further configured to determine (406) that the first state change at the first mobile computing device and the second state change at the second mobile computing device are related, and that the first mobile computing device and the second mobile computing device are currently located at a common geographic location. Mobile device control process 10 may be further configured to determine (408) that a third mobile computing device is currently located at the common geographic location. Mobile device control process 10 may be further configured to transmit (410) to the third mobile computing device, a third signal indicative of a recommended state change to the third mobile computing device, the recommended state change being based at least in part on the first state change at the first mobile computing device and the second state change at the second mobile computing device, wherein the recommended state change is based upon, at least in part, an amount of time between the first state change and the second state change.

Accordingly, implementations described herein may allow for identification of candidate situations and corresponding required state. The mobile device control process described herein may utilize a cloud based central system, which may be configured to dynamically monitor group level signals that could identify specific state requiring situations. The mobile device control process may identify users using any suitable technique, for example, by their user accounts, and across all carriers, devices and platforms. In some implementations, users may opt-out and the user's data may not be retained or used by the mobile device control process. In some implementations, once a specific situation pattern threshold is matched by group signals, the mobile device control process may analyze the estimate by using device level signals such as noise level, accelerometer data, etc.

The mobile device control process described herein may be configured to identify unique group signals and/or characteristics. Some of these may include, but are not limited to, the identification of a specific and/or high density of devices that occurs in a large enough range, a majority of the devices within a particular range are stationary, a majority of the devices within the range change device state to a specific state (e.g., mute) within a short enough interval, the group location is matching the geolocation of a venue where such situation can presumably take place (e.g., a concert hall or opera house). Additionally and/or alternatively, mobile device control process 10 may identify that a specific and/or high density of devices occurs in a large enough range, a majority of the devices within that range are stationary and/or moving with the same exact parameters, a majority of the devices within the range change device state to a specific communications-disabled state (e.g., an "airplane mode") within a short enough interval, the group location is matching the geolocation of a venue where such situation can presumably take place (such as an airport).

In some implementations, the mobile device control process 10 described herein may be configured to proactively push a notification, alert, etc. with a description of the learned situation and the recommended state to set. Additionally and/or alternatively, in some implementations, if the notification is ignored and the required state is not set for a set interval (e.g., 2 minutes), then the particular mobile device may proactively set the required state without user confirmation.

In some implementations, the mobile device control process described herein may be configured to allow for an initial setup phase, e.g., where the user may define the situations and/or the permission levels to change a particular device's state. Additionally and/or alternatively, the mobile device control process may be implemented using a decentralized device-to-device level, which may, for example, build upon a short range communication protocol.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A method comprising:
   receiving, at a computing device and from a first mobile device, (i) signal data indicative of a state change occurring at the first mobile device and (ii) first accelerometer data;
   receiving, at the computing device and from a second mobile device, (i) signal data indicative of a state change occurring at the second mobile device and (ii) second accelerometer data;
   determining, at the computing device and based at least in part on the first accelerometer data and the second accelerometer data, that the state change occurring at the first mobile device and the state change occurring at the second mobile device are related;
   receiving, at the computing device and from a third mobile device, third accelerometer data;
   responsive to determining, based on the third accelerometer data, that the third mobile device should undergo a state change, transmitting, by the computing device, to the third mobile device, a signal indicative of a recommended state change at the third mobile device, the recommended state change being based at least in part on one or more of the state change occurring at the first mobile device and the state change occurring at the second mobile device.

2. The method of claim 1, wherein:
   the state change occurring at the first device is associated with a first time;
   the state change occurring at the second device is associated with a second time; and
   the determining that the state change occurring at the first device and the state change occurring at the second device are related is further based on the first time and the second time.

3. The method of claim 1, further comprising:
   receiving, at the computing device and from the first mobile device, in addition to the signal data indicative of the state change occurring at the first mobile device, first ambient noise data;
   receiving, at the computing device and from the second mobile device, in addition to the signal data indicative of the state change occurring at the second mobile device, second ambient noise data; and
   wherein the determining that the state change occurring at the first mobile device and the state change occurring at the second mobile device are related is further based on the first ambient noise data and the second ambient noise data.

4. The method of claim 1, further comprising:
   receiving, at the computing device and from the first mobile device, in addition to the signal data indicative of the state change occurring at the first mobile device, an indication of a location associated with the first mobile device;
   receiving, at the computing device and from the first mobile device, in addition to the signal data indicative of the state change occurring at the second mobile device, an indication of a location associated with the second mobile device; and
   wherein the determining that the state change occurring at the first mobile device and the state change occurring at the second mobile device are related is further based on the location associated with the first mobile device and the location associated with the second mobile device.

5. The method of claim 1, wherein:
   the determining that the state change occurring at the first mobile device and the state change occurring at the second mobile device are related is further based on a percentage of mobile devices that have undergone a particular state change at a common geographic location associated with the first mobile device and the second mobile device.

6. The method of claim 5, wherein:
   the particular state change is at least one of the state change occurring at the first mobile device and the state change occurring at the second mobile device.

7. The method of claim 1 wherein: the first state change includes at least one of an airplane setting state change, a ringer setting state change, a vibration setting state change, and an audio setting state change.

8. A system comprising:
   at least one memory operatively coupled to a processor and configured for storing data and instructions that, when executed by the processor, cause the processor to perform a method comprising:
   receiving, at a computing device and from a first mobile device, (i) signal data indicative of a state change occurring at the first mobile device and (ii) first ambient noise data;
   receiving, at the computing device and from a second mobile device, (i) signal data indicative of a state change occurring at the second mobile device and (ii) second ambient noise data;
   determining, at the computing device and based at least in part on the first ambient noise data and the second ambient noise data, that the state change occurring at the first mobile device and the state change occurring at the second mobile device are related;
   receiving, at the computing device and from a third mobile device, third ambient noise data;
   responsive to determining, based on the third ambient noise data, that the third mobile device should undergo a state change, transmitting, by the computing device, to the third mobile device, a signal indicative of a recommended state change at the third mobile device, the recommended state change being based at least in part on one or more of the state change occurring at the first mobile device and the state change occurring at the second mobile device.

9. The system of claim 8, wherein:
   the state change occurring at the first mobile device is associated with a first time;
   the state change occurring at the second mobile device is associated with a second time; and
   the determining that the state change occurring at the first mobile device and the state change occurring at the second mobile device are related is further based on the first time associated with the state change occurring at the first mobile device and the second time associated with the state change occurring at the second mobile device.

10. The system of claim 8, further storing data and instructions that, when executed by the processor, cause the processor to perform the method further comprising:
receiving, at the computing device and from the first mobile device, in addition to the signal data indicative of the state change occurring at the first mobile device, first accelerometer data;
receiving, at the computing device and from the second mobile device, in addition to the signal data indicative of the state change occurring at the second mobile device, second accelerometer data; and
wherein the determining that the state change occurring at the first mobile device and the state change occurring at the second mobile device are related is further based on the first accelerometer data and the second accelerometer data.

11. The system of claim 8, wherein:
the first mobile device is associated with a location;
the second mobile device is associated with a location; and
the determining that the state change occurring at the first mobile device and the state change occurring at the second mobile device are related is further based on the location associated with the first mobile device and the location associated with the second mobile device.

12. The system of claim 11, wherein:
the location of the first mobile device is a first reported GPS location of the first mobile device; and
the location of the second mobile device is a second reported GPS location of the second mobile device.

13. The system of claim 8, wherein:
the state change occurring at the first mobile device includes at least one of an airplane setting state change, a ringer setting state change, a vibration setting state change, and an audio setting state change.

14. The system of claim 8, wherein:
the determining that the state change occurring at the first mobile device and the state change occurring at the second mobile device are related is further based on a number of mobile devices that have undergone a particular state change at a common geographic location associated with the first mobile device and the second mobile device.

15. A computer program product including a non-transitory computer readable medium for storing data and instructions that, when executed by a processor, cause the processor to perform a method comprising:
receiving, at a computing device and from a first mobile device, (i) signal data indicative of a state change occurring at the first mobile device and (ii) first accelerometer data;
receiving, at the computing device and from a second mobile device, (i) signal data indicative of a state change occurring at the second mobile device and (ii) second accelerometer data;
determining, at the computing device and based at least in part on the first accelerometer data and the second accelerometer data, that the state change occurring at the first mobile device and the state change occurring at the second mobile device are related;
receiving, at the computing device and from a third mobile device, third accelerometer data;
responsive to determining, based on the third accelerometer data, that the third mobile device should undergo a state change, transmitting, by the computing device, to the third mobile device, a signal indicative of a recommended state change at the third mobile device, the recommended state change being based at least in part on one or more of the state change occurring at the first mobile device and the state change occurring at the second mobile device.

16. The computer program product of claim 15, wherein:
the state change occurring at the first mobile device is associated with a first time;
the state change occurring at the second mobile device is associated with a second time;
the determining that the state change occurring at the first mobile device and the state change occurring at the second mobile device are related is further based on the first time associated with the state change occurring at the first mobile device and the second time associated with the state change occurring at the second mobile device.

17. The computer program product of claim 15, wherein further storing data and instructions that, when executed by the processor, cause the processor to perform the method further comprising:
receiving, at the computing device and from the first mobile device, in addition to the signal data indicative of the state change occurring at the first mobile device, first ambient noise data;
receiving, at the computing device and from the second mobile device, in addition to the signal data indicative of the state change occurring at the second mobile device, second ambient noise data; and
wherein the determining that the state change occurring at the first mobile device and the state change occurring at the second mobile device are related is further based on the first ambient noise data and the second ambient noise data.

18. The computer program product of claim 15, wherein:
the first mobile device is associated with a location;
the second mobile device is associated with a location; and
the determining that the state change occurring at the first mobile device and the state change occurring at the second mobile device are related is further based on the location associated with the first mobile device and the location associated with the second mobile device.

19. The computer program product of claim 15, wherein:
the state change occurring at the first mobile device includes at least one of an airplane setting state change, a ringer setting state change, a vibration setting state change, and an audio setting state change.

20. The computer program product of claim 15, wherein:
the determining that the state change occurring at the first mobile device and the state change occurring at the second mobile device are related is further based on a density of mobile devices that have undergone a particular state change at a common geographic location associated with the first mobile device and the second mobile device.

* * * * *